United States Patent [19]

Grudic et al.

[11] Patent Number: 4,941,739
[45] Date of Patent: Jul. 17, 1990

[54] MIRROR SCANNER

[75] Inventors: Gregory Z. Grudic, Richmond; Michael F. Kelly; Peter D. Lawrence, both of Vancouver, all of Canada

[73] Assignee: University of British Columbia, Canada

[21] Appl. No.: 297,406

[22] Filed: Jan. 17, 1989

[51] Int. Cl.⁵ .............................................. G02B 26/08
[52] U.S. Cl. ...................................... 350/486; 350/6.5
[58] Field of Search ................... 350/6.1, 6.5, 6.6, 6.9, 350/6.91, 484, 486

[56] References Cited

U.S. PATENT DOCUMENTS

| | | | |
|---|---|---|---|
| 4,021,096 | 5/1977 | Dragt | 350/6.5 |
| 4,039,246 | 8/1977 | Voigt | 250/236 |
| 4,427,878 | 1/1984 | Buchel | 250/203 R |
| 4,680,522 | 7/1987 | St. Clair et al. | 350/486 |
| 4,838,632 | 6/1989 | Manian | 350/6.91 |

FOREIGN PATENT DOCUMENTS

| | | | |
|---|---|---|---|
| 1089267 | 11/1980 | Canada. | |
| 0108514 | 6/1983 | Japan | 350/6.91 |
| 1290231 | 2/1987 | U.S.S.R. | 350/6.5 |

Primary Examiner—Bruce Y. Arnold
Assistant Examiner—Ronald M. Kachmarik
Attorney, Agent, or Firm—C. A. Rowley

[57] ABSTRACT

A mirror scanning system comprises a single mirror mounted to rotate on a first axis that is substantially in the plane of the mirror reflecting surface and on a second axis perpendicular to and intersecting the first axis. Both the mirror and the first axis rotate around the second axis. An optical system is directed at a portion of the reflecting surface of the mirror at or adjacent to the intersection of the two axes and has a focal axis substantially aligned with the second axis. By aligning the reflecting surface in a direction so as to maximize a signal emanating from a source and detected at a selected position on a detector forming part of the optical system and measuring the angular displacement of the mirror around each of the first and second axes with the reflecting surface so aligned, the direction of a detected source can be determined. Alternatively if the optic system includes the source in place of the detector the energy emitted from the source located in the optical system can be reflected in a selected direction that can be easily and rapidly changed.

7 Claims, 2 Drawing Sheets

MIRROR SCANNER

FIELD OF THE INVENTION

The present invention relates to a mirror scanning system. More particularly the present invention relates to an optical system employing a mirror that is pivoted about two substantially mutually perpendicular axes and having the focal axis of the optic system substantially aligned with one of the axes.

BACKGROUND OF THE PRESENT INVENTION

The use of a single mirror for directing a source of energy such as light beam to or from an optical system such as a detector array is employed for example in video disk players. Canadian Pat. No. 1,089,267 issued Nov. 11, 1980 to Uneki et al discloses one typical system of incorporating a mirror that is wobbled (pivoted on two mutually perpendicular axes) around a centre point by means of two pair of controllable electromagnetic devices so that the precise angular position of the mirror around both axes is controllably adjustable and is therefore known. A similar device is disclosed in U.S. Pat. No. 4,021,096 issued May 3, 1977 to Dragt. In these devices it is the tilting of the mirror about the mutually perpendicular axes that directs the light in the proper direction, the two mutually perpendicular axes are fixed so that there can be no rotation of one of the axes with the other axis.

It is known to rotate a mirror in a scanning system as disclosed for example in U.S. Pat. No. 4,039,246 issued Aug. 2, 1977 to Voigt or U.S. Pat. No. 4,427,878 issued Jan. 24, 1984 to Buchtel which utilize such systems in an optical scanning apparatus for missile seekers. In both of these systems a pair of mirrors rotating on a common axis are used. These mirrors are able to scan a rosette pattern in the field of view.

The above referred to U.S. Pat. No. 4,039,246 of Voigt rotates a secondary mirror around an axis and pivots this secondary mirror on an axis perpendicular to the rotational axis to generate the rosette pattern.

With robotic manipulators the position of the load or a selected point on the robot arm is difficult to determine by standard kinematic relationships alone. When loading on the arm causes distortion of arm segments (eg. bending of an arm segment) such distortions are not accurately predictable and these kinematic relationships do not accurately determine the position of the arm. Also in cases of arms with a multiplicity of links or arm segments excessive amounts of computing time may be required for end point determination using kinematic relationships. Thus some form of direct determination of end point position is desirable particularly to provide feedback to be used in an adaptive control application to correct errors. One way to monitor is to use a video camera configured to view the entire range of movement of the manipulator arm. The disadvantage of using such a system, however, is that the detecting computer would be required to analyze the manipulator's total work area to determine the location of the end point.

Commercially available mirror scanning systems normally have a small scanning range (a viewing range of less than 40 degrees) and employ two mirrors much in the manner of the two mirror systems used in the missile seeker above described in relation to U.S. Pat. Nos. 4,039,246 and 4,427,878.

BRIEF DESCRIPTION OF THE PRESENT INVENTION

It is an object of the present invention to provide a mirror scanner system adapted to scan large areas and of simple construction in that only a single mirror is employed.

Broadly the present invention comprises a scanner comprising a mirror having a reflecting surface, an optic system having a focal axis directed at an area of said reflecting surface, means for mounting said mirror to rotate about a first axis located substantially in the plane of said reflecting surface, means for rotating said mirror about said first axis, means mounting said mirror and said first axis for rotation about a second axis substantially mutually perpendicular with said first axis, means for rotating said mirror and said first axis about said second axis, said second axis and said focal axis being substantially in axial alignment, and means to measure the angular position of said mirror around said first and said second axes.

Preferably said optical system will include a sensor for detecting a signal emanating from an external source and reflected into said optical system from said area of said reflecting surface, and computer means will be provided to determine the location on said sensor receiving said signal.

Preferably the scanner will be provided with means to angularly adjust the position of said mirror around said first and second axes in accordance with the location of said signal on said sensor to direct said signal to a selected location on said sensor.

Preferably said second axis is formed by a hollow axle and a connecting means extends through said hollow axle and is connected to said mirror at a position offset from said first axis and wherein said means to rotate said mirror about said first axis includes means for moving said connecting means axially of said hollow axle.

BRIEF DESCRIPTION OF THE DRAWINGS

Further features, objects and advantageous will be evident from the following detailed description of the preferred embodiments of the present invention taken in conjunction with the accompanying drawings in which.

DESCRIPTION OF THE PREFERRED EMBODIMENTS

Figure 1:
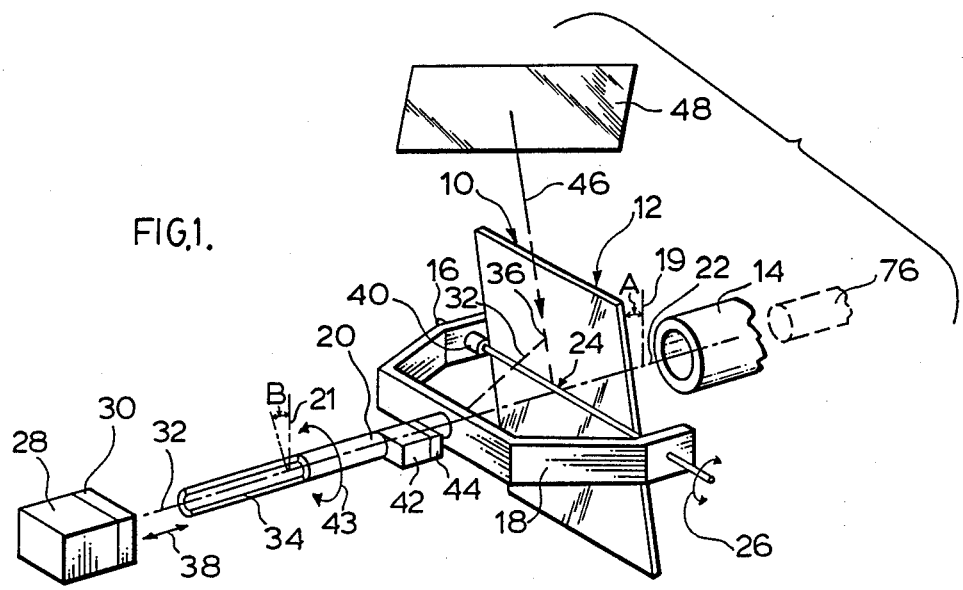
FIG. 1 is a schematic illustration of an optical system incorporating the present invention.

The scanner system of the present invention includes a mirror 10 having a reflecting surface 12 facing an optic system 14. The mirror 10 is mounted on a first axis i.e. the axis of an axle 16 which in turn is mounted on a yoke 18 that is rotatable with shaft 20 around a second axis i.e. the longitudinal axis of the shaft 20. The longitudinal axis of the shaft 20 is axially aligned with the focal line or axis 22 of the optic system 14 and intersects at a right angle with the longitudinal axis of the axle 16 at point 24 on the reflecting surface 12. This the axis of rotation of the axle 16 and shaft 20 are mutually perpendicular and the focal axis 22 of the optic system 14 is axially aligned with the axis of rotation of the shaft 20.

The mirror 10 is rotated around the axis of the axle 16 as indicated by the arrow 26 via a suitable drive mechanism which includes a drive motor 28 and sensor 30 which determines the angular position of the reflecting surface 12 relative to a datum plane. In the illustrated arrangement the angle A between the surface 12 and a datum formed by a plane schematically illustrated by the line 19 which is perpendicular to the axis of the shaft 20, for example, a plane containing or extending axially of shaft 16 and perpendicular to the axis of the shaft 20.

The motor or drive 28 extends or retracts the cable 32 which extends axially through the axial passage 34 through the shaft 20 and connects to the rear face of the mirror 10 at a point 36 located offset from the axis of axle 16, preferably in a plane extending axially of shaft 20 and perpendicular to the axle 16 i.e. the cable 32 extends from the motor 28 through the shaft 20 and connects to the mirror 10 at an appropriate distance offset from the axle 16 so that movement of the cable as indicated by the arrow 38 pivots the mirror 10 around the axis of axle 16.

It will be apparent that the cable 32 can only apply forces to the mirror 10 by acting in tension and thus can only rotate the mirror in one direction. A suitable coil spring 40 is provided to bias the mirror 10 to rotate in the opposite direction, in the illustrated arrangement in the clockwise direction (FIG. 1), thereby to maintain tension in the cable 32 at all times. The opposite end of the cable 32— the motor 28— end may also be provided with a tension spring (not shown) to insure tension in the cable 32.

If desired, a suitable rigid link mechanism may be substituted for the cable 32 but a substantially non stretchable cable has been used in the model to maintain accuracy.

The yoke 18 carrying the axle 16 and mirror 10 is rotated with shaft 20 by a suitable motor or the like 42 as indicated by the arrow 43 and the angular position of the shaft 20 and thus the axle 16 is measured by the measuring device 44 which may form a portion of the drive 42. This angular position is designated in FIG. 1 by the angle B which in the illustrated arrangement is the angle of a selected point or line on the axle 16 to a selected plane extending axially along the axis of the shaft 20 and schematically represented by the line 21.

Light directed onto the reflecting surface 12 as indicated by the ray 46 extending from the scan area 48 is reflected from the area on the reflecting surface 12 adjacent the intersection 24 into the optic system 14 as will be described below.

Figure 2:
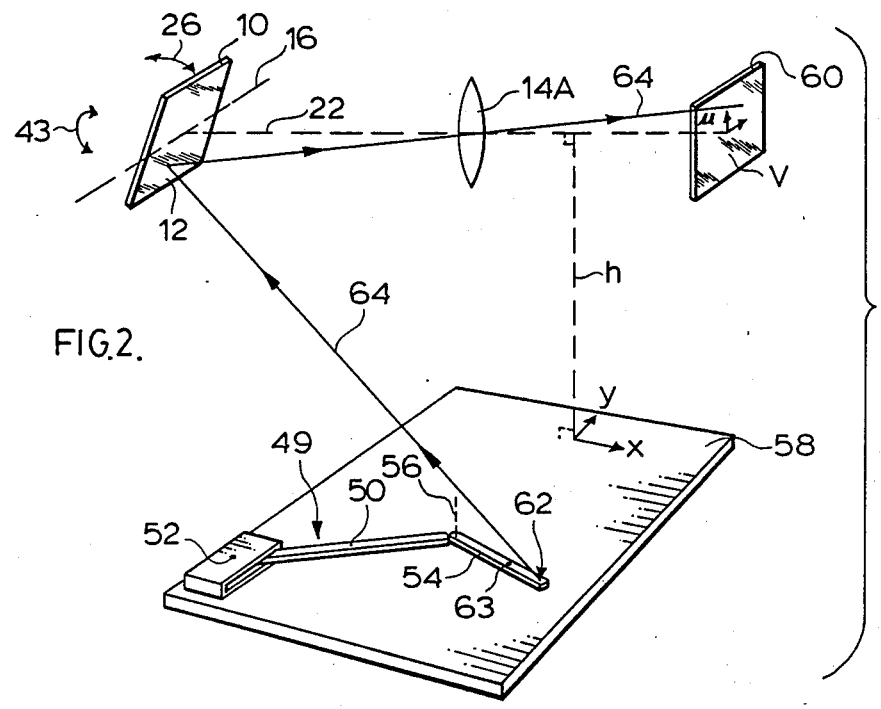
FIG. 2 is a schematic illustration of one mode of operation of a scanner incorporating the present invention.
Figure 3:
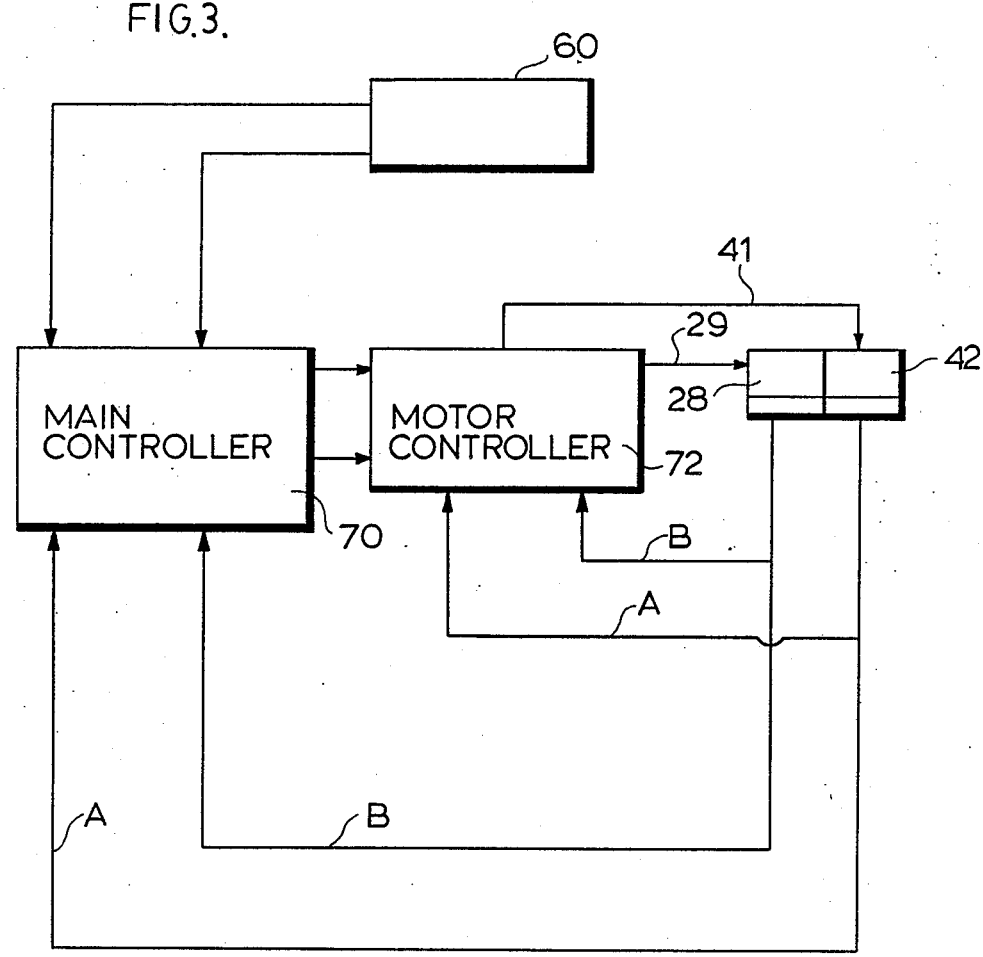
FIG. 3 is a schematic illustration of a control system for the optical system of FIG. 1.

Referring now to FIG. 2, the schematic illustration of a two link arm 49 has been provided. The two link arm 49 has a first link 50 pivotable around the axis 52 and a second link 54 pivoted to the free end of the link 50 for movement around the axis 56 which is substantially parallel to the axis 52. The plane of movement of the arm 49 has been indicated by the surface 58. It will be apparent that in an excavator or the like with two or more link arms the plane of movement of the arms (equivalent to plane 58) will be moveable, probably rotatable on an axis substantially perpendicular to the axis 52 (and 56) and thus to determine the position in space of a point on such a moveable arm (eg. a point equivalent to the end point 62 of the arm 49) the position of the moveable plane i.e. the angular and spatial position of the plane equivalent to plane 58 to a datum (the focal axis 22) will be necessary, or means to determine the distance between the scanner and the end point equivalent to the end point or source 62 on the end of the link or arm 49 will have to be provided.

In the simplest system for calculating position of point 62 relative to a known position in the plane 58, the axis 22 will be parallel to the plane 58 and the distance h measured between the axis 22 and the plane 58 will be known. This information coupled with the values for angles A and B permits easy calculation of the location of point 62 by geometry.

The mirror 10 is rotatable as indicated by the arrows 26 and 43 about the mutually perpendicular axes of the shaft 20 and axle 16. The optic system is schematically indicated in FIG. 2 by a lens 14A focal axis 22 (dash line) and a sensor 60 which in the illustrated arrangement of FIG. 2 is a detector array.

The sensor 60 in the following detailed description is a detector array which is used to detect ray 64 (described below) and align or otherwise position it relative to a selected point on the sensor 60, however, other means such as photodiodes with lateral collection for position sensing or other suitable position sensing devices may be used for this purpose.

In the FIG. 2 illustration a light source at end point 62 is mounted at the free end of the second arm 54. The light from this source travels as indicated by the ray 64 onto the mirror surface 12 and is reflected from the surface 12 through the lens 14A to the detector array 60. The detector array 60 is used in conjunction with any suitable system to determine the location where the ray 64 strikes the array (location of the area of greatest illumination on the array) and to provide U - V signals (coordinates on the array 60). These U - V coordinates are then used to control the adjustment of the angles A and B to maximize the signal at a selected point (for easiest operation the intersection of focal axis 22 of the optical system) on the array 60. These angles A and B are in turn detected by the detectors or measuring mechanisms 30 and 44 respectively so that the angular position of the face 12 is always known.

When the invention is to be operated as a detector (FIG. 2) the main computer controller 70 is fed the information from the array 60 to provide the U - V coordinates which may be directly available from the chip forming the detecting array or calculated in the computer. The detector array 60 may for example be a charge coupled device (CCD) as used in conventional video cameras or any other suitable detector. The sensor or detector array 60 develops information relating to the U - V coordinates and the computer 70 utilizes this information and adjusts the motor controller 72 which controls the motors 28 and 42 (via lines 29 and 41 respectively) to adjust the position of the mirror 10 until the ray 64 is substantially aligned with the selected location on the array 60 (the focal axis 22.) After the mirror has been adjusted the angles A and B are determined by the measuring devices 30 and 44 respectively, signals are fed back to the main and motor controllers 70 and 72 and the position and direction of the ray 64 is determined, whereby the location of the point or source 62 can be determined if the location of the plane 58 is known.

Thus using well known technology the ray 64 may be aligned with the axis 22 and the changes to the angles A and B needed to align the ray 64 with the selected position (the axis 22) determined and/or the new values for the angles A and B measured. In the simplest arrangement as described with the plane 58 and axis 22 parallel and the distance h therebetween known, the location of the end point 62 on the plane 58 relative to a known reference location on the plane 58 may easily be determined by geometry.

If the location of the plane 58 is not fixed i. e. is unknown, it must be determined before the location of the source can be defined. In an excavator the angular position of the plane of the boom relative to the base can simply be measured to determine the plane of the boom (equivalent to the plane 58 in FIG. 2.)

It is also possible to determine the distance between the source 62 and the mirror surface 12. For example, three sources located one at each apex of a known non equilateral triangle may be detected and by triangulation based on the known source spacing and the angles of the rays from each such source to the mirror surface 12 the distances to the mirror surface from the sources determined. Other techniques are also well known for determining distance, for example, suitable automatic camera focusing techniques, phase sensitive detectors, ultrasonics, etc.

It may be desirable to use the present invention in a different manner, for example as a projector. In this case in place of the detector 64 a light source 76 (illustrated in dash lines at in FIG. 1) such as a laser may be directed substantially along the focal line 22 and the mirror 10 then manipulated by changing the angles A and B in a controlled manner to direct the light beam emitted from the source 76 to a select point.

It will be apparent that the angles A and B can be adjusted over wide limits. The angle A in the illustrated arrangement is mechanically limited by the width and location of the yoke 18 (if the yoke is far enough away the rotation need not be limited by the yoke.) However, for other reasons it is not practical to adjust the angle A through substantially a full circle (360 degrees.) Obviously if angle A is too large, at the extreme if angle A=90 degrees to the plane represented by line 19 the device is inoperative. Generally it is preferred to operate the invention with maximum angular adjustments of A less than about 75 degrees to line 19 to permit movement over an arc of 150 (preferable less than 60 degrees, an arc of 120 degrees) and preferably permit angular adJustment of angle A of at least about 30 degrees i.e. a 60 degree arc. The angle B on the other hand preferable will be adjustable through substantially the full circle (360 degrees.)

It will be apparent that for the scanner to determine the location of a source such as source 62 the signal source must first be found and directed by the mirror 10 into the optic system and onto the array 60. Preliminary manipulation of the mirror 10 will be controlled by the computer 70 to systematically scan the field of view of the scanner until the signal from the source activates the array 60 which will then override the systematic scan and provide the necessary signal to permit the mirror to be manipulated to home in on the source 62 and as above described align the ray 64 with the selected spot on the array 60, preferably by axially aligning the ray 64 with the axis 22.

While the description has described the light beams as being axially aligned with the focal line 22 of the optic system 14 it will be apparent that with proper computer programing that some misalignment may be accommodated, but it is simpler and is preferred to align the beams with the focal axis 22.

The reflecting face 12 of the mirror 10 is normally located in a plane of the axis of axle 16. The surface 12 could be positioned parallel to this axis but spaced slightly therefrom, but this would require suitable and in most cases significant modification of the computer program determining the location of the source 62, if accuracy is to be maintained. Any major repositioning of the plane of the surface 12 from the axis of axle 16 will render the device inoperative.

The axes of the axle 16 and the shaft 20 intersect at about the centre of the mirror surface 12. Again it is possible to offset these axes slightly but the operation and accuracy of the device will be affected and the programming significantly more complicated.

Having described the invention, modifications will be evident to those skilled in the art without departing from the spirit of the invention as defined in the appended claims.

We claim:

1. A scanner comprising a mirror having a reflective surface, an optical system having a focal axis directed at an area of said reflecting surface, means for mounting said mirror to rotate about a first axis located substantially in the plane of said reflecting surface, means for rotating said mirror about said first axis, means mounting said mirror and said first axis for rotation about a second axis, said second axis being formed by a hollow shaft, said means to rotate said mirror about said first axis including a substantially non extendable cable under tension extending through said hollow shaft and connected to said mirror in a position spaced from said first axis, means for biasing said mirror to maintain tension in said cable and means for moving said connecting means substantially axially of said hollow shaft, said first axis and said second axis being substantially mutually perpendicular and intersecting, means for rotating said mirror and said first axis about said second axis, said second axis and said focal axis being substantially in axial alignment.

2. A scanner as defined in claim 1 wherein said optic system includes a light source projecting light along said focal axis and wherein movement of said mirror around said first and second axes directs light from said source in selected directions.

3. A scanner comprising a mirror having a reflective surface, an optical system having a focal axis directed at an area of said reflecting surface, said optical system including a sensor for detecting the location of the position where an energy signal emanating as a ray from a source and reflected into said system form said reflecting surface strikes said sensor and determining a U coordinate and a V coordinate for said position and provide corresponding U and V coordinate signals, means for mounting said mirror to rotate about a first axis located substantially in the plane of said reflecting surface, means for rotating said mirror about said first axis, means mounting said mirror and said first axis for rotation about a second axis, said first axis and said second axis being substantially mutually perpendicular and intersecting, means for rotating said mirror and said first axis about said second axis, said second axis and said focal axis being substantially in axial alignment, means to measure a first angle indicating the angular position of said mirror around said first axis relative to a datum plane substantially perpendicular to said second axis and means to measure a second angle indicative of the angular displacement of said first axis around said second axis relative to a second datum, said second datum being a plane axial on said second axis, a computer means to control said means for rotating said mirror around said first and said second axes into mirror orientations having selected first and second angles, said computer means having means to analyses said signals from said sensor and to control said means for rotating said mirror about said first and said second axes to substantially align said position with a selected area on said sensor.

4. A scanner as defined in claim 3 wherein said computer means controls said means for rotating said mirror about said first and second axes to substantially align said position with said focal axis.

5. A scanner as defined in claim 4 wherein said source is moveable in a plane substantially parallel with said focal axis.

6. A scanner as defined in claim 3 wherein said second axis is formed by a hollow shaft and wherein said means to rotate said mirror about said first axis includes a connecting means extending through said hollow shaft and connected to said mirror in a position spaced from said first axis and means for moving said connecting means substantially axially of said hollow shaft.

7. A scanner as defined in claim 6 wherein said connecting means comprises a substantially non extendable cable under tension and wherein said mirror is biased to maintain tension in said cable.

* * * * *